B. COKLY.
Apparatus for Loading and Unloading Wagons.
No. 143,222. Patented September 30, 1873.
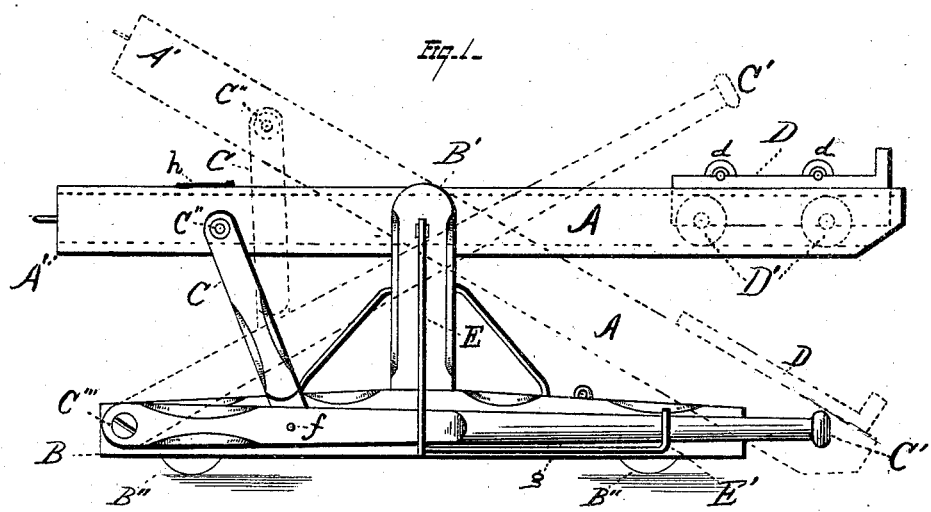
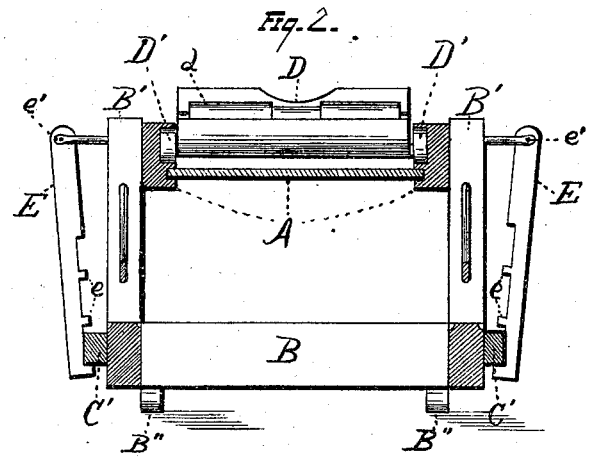
WITNESSES.                                     INVENTOR
                                               Benjamin Cokly
                                         By Leggett & Leggett
                                                    Attorneys.

UNITED STATES PATENT OFFICE.

BENJAMIN COKLY, OF WASHINGTON, DISTRICT OF COLUMBIA.

IMPROVEMENT IN APPARATUS FOR LOADING AND UNLOADING WAGONS.

Specification forming part of Letters Patent No. 143,222, dated September 30, 1873; application filed August 11, 1873.

*To all whom it may concern:*

Be it known that I, BENJAMIN COKLY, of Washington, District of Columbia, have invented certain new and useful Improvements in Device for Loading and Unloading Wagons, &c.; and I do hereby declare the following to be a full, clear, and exact description of the invention, such as will enable others skilled in the art to which it pertains to make and use it, reference being had to the accompanying drawings, which form part of this specification.

My invention relates to an improvement in apparatus for loading and unloading carts, wagons, cars, &c.

In the drawings, Figure 1 represents a side elevation of my invention, and Fig. 2 a vertical cross-section of the same.

My invention consists as follows: To the bed B are fixed the uprights B', upon which is swung the platform A. This platform is operated by the lever C', pivoted to the bed B at C''', and connected to the platform by the bar C. D is a truck traveling from one end of the platform A to the other upon the wheels D'. These wheels are so housed in the sides of the platform A as to prevent upward displacement. Upon the truck D are placed the friction-rollers $d$, for obvious purposes.

The operation of my invention is as follows: When a vehicle is to be loaded the lever C' is raised and the posterior end of the platform A is brought to the ground, as shown by the dotted lines in Fig. 1. In this position the truck D can be easily loaded, after which, by the depression of the lever C', the end A' of the platform may be brought to any desired level and retained by means of the adjusting-bar E, or its equivalent.

The adjusting device, as shown in the accompanying drawings, consists of the bars E, provided with the teeth $e$. This bar is swung from the pivot $e'$, and is operated by the lever E', fulcrumed to the bed B at $g$.

I do not, however, propose to limit myself to this specific method of fixing the platform at any desired point, as any equivalent provision may be made for accomplishing the same object. When the end A' of the platform is upon a level with the vehicle to be loaded, it is there secured and the burdened truck D moved to the place of unloading. The entire machine is made portable by means of the wheels B'' of the bed B.

The operation described is reversed for the purpose of unloading, with the exception that, while the platform is tilted to receive the load, the truck D is prevented from running down by means of retaining-hooks $h$.

I claim as my invention—

1. The combination of the platform A, bed B, supports B', lever C', and connecting-bar C, substantially as and for the purpose described.

3. The combination of the lever C' and adjusting device E $e$ E' $g$, or its equivalent, with the bed B and uprights B' of a loading device, substantially as shown, and for the purpose specified.

In testimony that I claim the foregoing I have hereunto set my hand this 9th day of August, 1873.

BENJAMIN ×<sup>his</sup><sub>mark.</sub> COKLY.

Witnesses:
LEVERETT L. LEGGETT,
EDM. F. BROWN.